US007009765B2

(12) United States Patent
Gohman

(10) Patent No.: US 7,009,765 B2
(45) Date of Patent: Mar. 7, 2006

(54) WIDE ANGLE LENS SYSTEM HAVING A DISTORTED INTERMEDIATE IMAGE

(75) Inventor: Jeffrey Alan Gohman, Hillsboro, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/222,050

(22) Filed: Aug. 16, 2002

(65) Prior Publication Data

US 2004/0032653 A1  Feb. 19, 2004

(51) Int. Cl.
*G02B 27/18* (2006.01)
(52) U.S. Cl. ................... 359/434; 359/433; 353/99
(58) Field of Classification Search ................ 359/362, 359/433, 434, 648, 649, 650, 651; 353/30, 353/98, 99
See application file for complete search history.

(56) References Cited

U.S. PATENT DOCUMENTS

| 4,674,836 | A |   | 6/1987  | Yata et al. |
| 4,729,631 | A |   | 3/1988  | Takahashi et al. |
| 4,880,292 | A |   | 11/1989 | Kageyama et al. |
| 4,936,657 | A |   | 6/1990  | Tejima et al. |
| 5,100,222 | A | * | 3/1992  | Minoura et al. ............ 359/455 |
| 5,302,983 | A | * | 4/1994  | Sato et al. ..................... 353/69 |
| 5,422,691 | A |   | 6/1995  | Ninomiya et al. |
| 5,442,413 | A | * | 8/1995  | Tejima et al. ................. 353/69 |
| 5,442,484 | A |   | 8/1995  | Shikawa |
| 5,489,940 | A |   | 2/1996  | Richardson et al. |
| 5,495,306 | A | * | 2/1996  | Shibazaki .................... 353/99 |
| 5,710,668 | A |   | 1/1998  | Gohman et al. |
| 5,716,118 | A |   | 2/1998  | Sato et al. |
| 5,724,195 | A |   | 3/1998  | Enomoto et al. |
| 5,760,973 | A |   | 6/1998  | Kawamura |
| 5,796,528 | A |   | 8/1998  | Mihara |
| 5,805,359 | A |   | 9/1998  | Yamanashi |
| 5,820,240 | A |   | 10/1998 | Ohzawa |
| 5,833,339 | A |   | 11/1998 | Sarayeddine |
| 5,870,234 | A |   | 2/1999  | Ebbesmeier nee Schitthof |
| 5,923,479 | A |   | 7/1999  | Nagata |
| 5,978,051 | A |   | 11/1999 | Gohman et al. |

(Continued)

FOREIGN PATENT DOCUMENTS

JP          2989947        5/1993

OTHER PUBLICATIONS

H. Kanayama et al., "A New LC Rear-Projection Display Based on The Aspherical Mirror Projection System," IDW, 2000, pp. 1041-1044, SANYO Electric Co., Ltd., Osaka, Japan.

(Continued)

*Primary Examiner*—Mark A. Robinson
(74) *Attorney, Agent, or Firm*—Alleman Hall McCoy Russell & Tuttle LLP

(57) ABSTRACT

The wide angle lens system described herein allows projection devices (e.g., rear projection display devices) to be more compact than would otherwise be possible. The lens system includes a wide angle lens stage and a relay lens stage. When operating as a projection device, the relay lens stage projects a distorted intermediate image to the wide angle lens stage, which projects the image for display. The distortion cause by the relay lens stage compensates (i.e., is approximately equal and opposite) for the distortion caused by the wide angle stage. The distortion can be the image shape and/or the focal plane. When operating as a taking device, the wide angle stage provides a distorted image to the relay lens stage, which compensates for the distortion and provide a less distorted, or even non-distorted image, for capture.

60 Claims, 6 Drawing Sheets

U.S. PATENT DOCUMENTS

| | | |
|---|---|---|
| 5,999,332 A | 12/1999 | Ohno |
| 6,016,229 A | 1/2000 | Suzuki |
| 6,018,425 A | 1/2000 | Nakabayashi et al. |
| 6,038,085 A | 3/2000 | Nakazawa |
| 6,046,859 A | 4/2000 | Raj |
| 6,053,615 A | 4/2000 | Peterson et al. |
| 6,081,380 A | 6/2000 | Ohshima et al. |
| 6,088,172 A | 7/2000 | Sato |
| 6,111,701 A | 8/2000 | Brown |
| 6,123,425 A * | 9/2000 | Ohzawa ........................ 353/69 |
| 6,137,638 A | 10/2000 | Yamagishi et al. |
| 6,147,812 A | 11/2000 | Narimatsu et al. |
| 6,201,647 B1 | 3/2001 | Ohzawa |
| 6,236,511 B1 | 5/2001 | Brown |
| 6,273,338 B1 | 8/2001 | White |
| 6,299,313 B1 | 10/2001 | Hirata et al. |
| 6,301,058 B1 | 10/2001 | Nagahara |
| 6,353,509 B1 | 3/2002 | Nakazawa |
| 6,366,400 B1 | 4/2002 | Ohzawa |
| 6,384,987 B1 | 5/2002 | Sensui |
| 6,396,641 B1 | 5/2002 | Hirata et al. |
| 6,406,150 B1 * | 6/2002 | Burstyn ........................ 353/69 |
| 6,407,860 B1 | 6/2002 | Funazaki et al. |
| 6,416,181 B1 * | 7/2002 | Kessler et al. ................. 353/7 |
| 6,419,365 B1 | 7/2002 | Potekev et al. |
| 6,485,145 B1 * | 11/2002 | Cotton et al. ................. 353/69 |
| 6,513,935 B1 | 2/2003 | Ogawa |
| 6,561,649 B1 | 5/2003 | Burstyn |
| 6,624,952 B1 * | 9/2003 | Kuwa et al. ................. 359/726 |
| 6,768,594 B1 | 7/2004 | Imafuku et al. |
| 2002/0008853 A1 | 1/2002 | Sunaga |
| 2002/0044263 A1 | 4/2002 | Takeuchi |
| 2003/0025885 A1 | 2/2003 | Cotton et al. |
| 2003/0231261 A1 | 12/2003 | Bassi et al. |
| 2004/0001254 A1 | 1/2004 | Shimizu |

OTHER PUBLICATIONS

J. Ouellette, "Digital Displays with Micromirror Devices," American Institute of Physics, Jun. 1997, pp. 9-11.

J. Shinozaki, et al., 15.3: A 50-in. Ultra-Slim Liquid-Crystal Rear Projector, SID 92 Digest, 1992, pp. 273-276, Seiko Epson Corp., Tokyo, Japan.

* cited by examiner

WIDE ANGLE LENS SYSTEM HAVING A DISTORTED INTERMEDIATE IMAGE

RELATED APPLICATIONS

The present U.S. Patent application is related to U.S. patent application Ser. No. 10/222,083, entitled "Rear projection display device having multiple mirrors that ares substantially parallel to a screen" filed Aug. 16, 2002.

FIELD

The invention relates to lenses for use in optical devices. More particularly, the invention relates to lenses for use in optical devices employing wide angle lens systems.

BACKGROUND

In order to provide a television with a screen size greater than approximately 40 inches a display device other than a direct view cathode ray tube (CRT) is typically used. As the screen size of a CRT increases, so too does the depth. It is generally accepted that for screen sizes greater than 40 inches direct view CRTs are no longer practical. Two alternatives exist for large screen (>40 inch screen size) displays: projection displays and plasma displays.

Current plasma displays are much more expensive than projection displays. Plasma displays are generally thin enough to mount on a wall, but can be heavy enough that mounting can be difficult. For example, current 42 inch plasma displays can weigh 80 pounds or more and 60 inch plasma displays can weigh 150 pounds or more. One advantage of plasma displays over current projection displays is that plasma displays are typically much thinner than current projection displays having the same screen size.

Projection displays, specifically rear projection displays, are typically more cost-effective then plasma displays. Projection displays may also consume too much space in a room to provide a practical solution for large screen needs. For example, typical 60 inch rear projection displays are 24 inches thick and can weigh 200 to 300 pounds.

FIG. 1 illustrates a prior art rear projection display device. In general, display device 100 includes optical engine 140, projection lens 130, back plate mirror 120 and screen 110. Optical engine 140 generates an image to be projected on screen 110. projection lens 130 projects the image from optical engine 140 on to back plate mirror 120, which reflects the image to screen 110. The size of display device 100 is proportional to the size of the image to be displayed on screen 110. Thus, for large screen sizes (e.g., >60 inches), the overall size of display device 100 can be very large.

Thin rear projection display devices have been developed that are less than 12 inches thick. However, these thinner rear projection display devices typically rely on an aspherical mirror, which is difficult to manufacture and difficult to align. The difficulties associated with the aspherical mirror results in current thin rear projection displays being expensive, which restricts the availability of rear projection displays in desirable packages.

FIG. 2 illustrates a prior art thin rear projection display device with an aspherical mirror. An image from optical engine 260 is projected on reflective mirror 240 by projection lens 250. Reflective mirror 240 reflects the image to aspherical mirror 230, which magnifies the projected image and extends the field ray angle. Aspherical mirror 230 reflects the image to back plate mirror 220, which then reflects the image to screen 210. While rear projection display device 200 provides a thinner package for the same size screen as compared to display device 100 of FIG. 1, the manufacturing and alignment issues associated with use of aspherical mirror 230 greatly increases the cost of display device 200.

Another shortcoming of display device 200 is the angle of optical engine 260 with respect to mirrors 220, 230 and 240 and to screen 210. Without compensation, the angle of optical engine 260 results in a trapezoidal, or keystone, shaped image. The compensation associated with the angle to provide a square image further increases the cost and complexity of display device 200.

SUMMARY

In one embodiment, a lens system includes a first stage to create a distorted intermediate image and a second, wide angle lens stage that causes distortion to substantially cancel the distortion of the intermediate image and to project a substantially non-distorted image corresponding to the intermediate image.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Wide angle lens systems having a distorted intermediate image are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The wide angle lens system described herein allows projection devices (e.g., rear projection display devices) to be more compact than would otherwise be possible. The lens system includes a wide angle lens stage and a relay lens stage. When operating as a projection device, the relay lens stage projects a distorted intermediate image to the wide angle lens stage, which projects the image for display. The distortion caused by the relay lens stage compensates (i.e., is approximately equal and opposite) for the distortion caused by the wide angle stage. The distortion can be to the image shape and/or the focal plane. When operating as a taking device, the wide angle stage provides a distorted image to the relay lens stage, which compensates for the distortion and provides a less distorted, or even non-distorted image, for capture.

Figure 1:
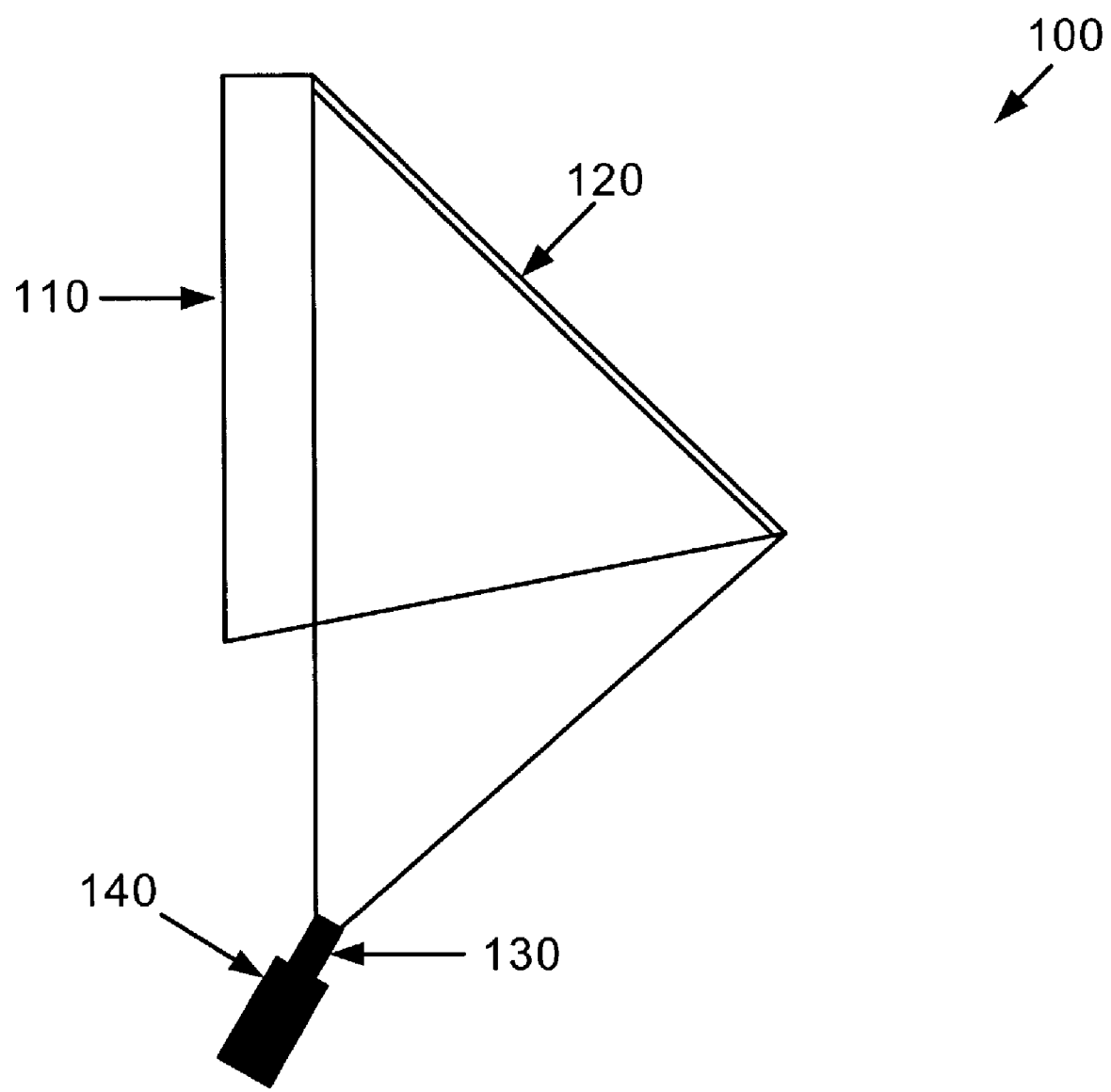
FIG. 1 illustrates a prior art rear projection display device.
Figure 2:
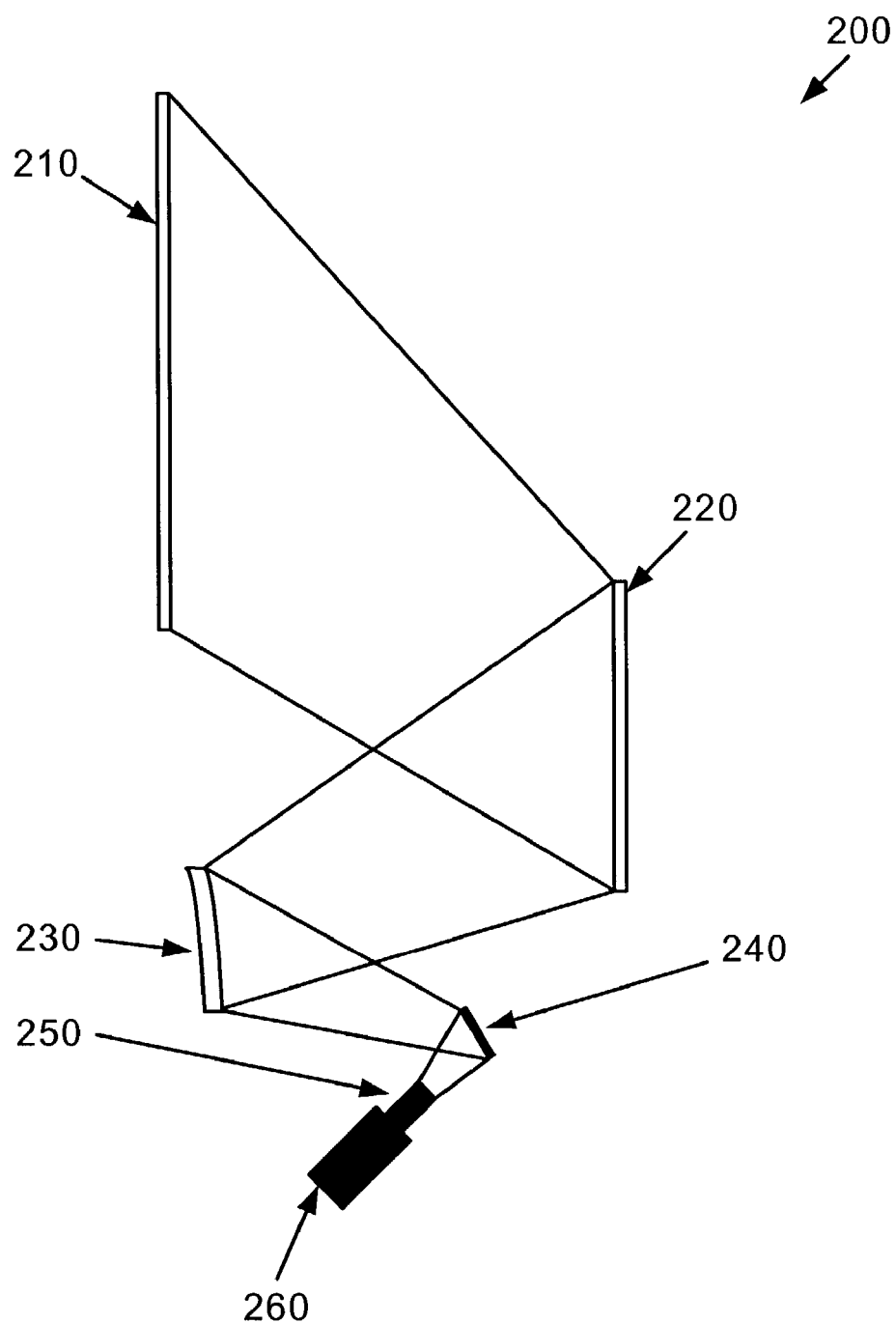
FIG. 2 illustrates a prior art thin rear projection display device with an aspherical mirror.
Figure 3:
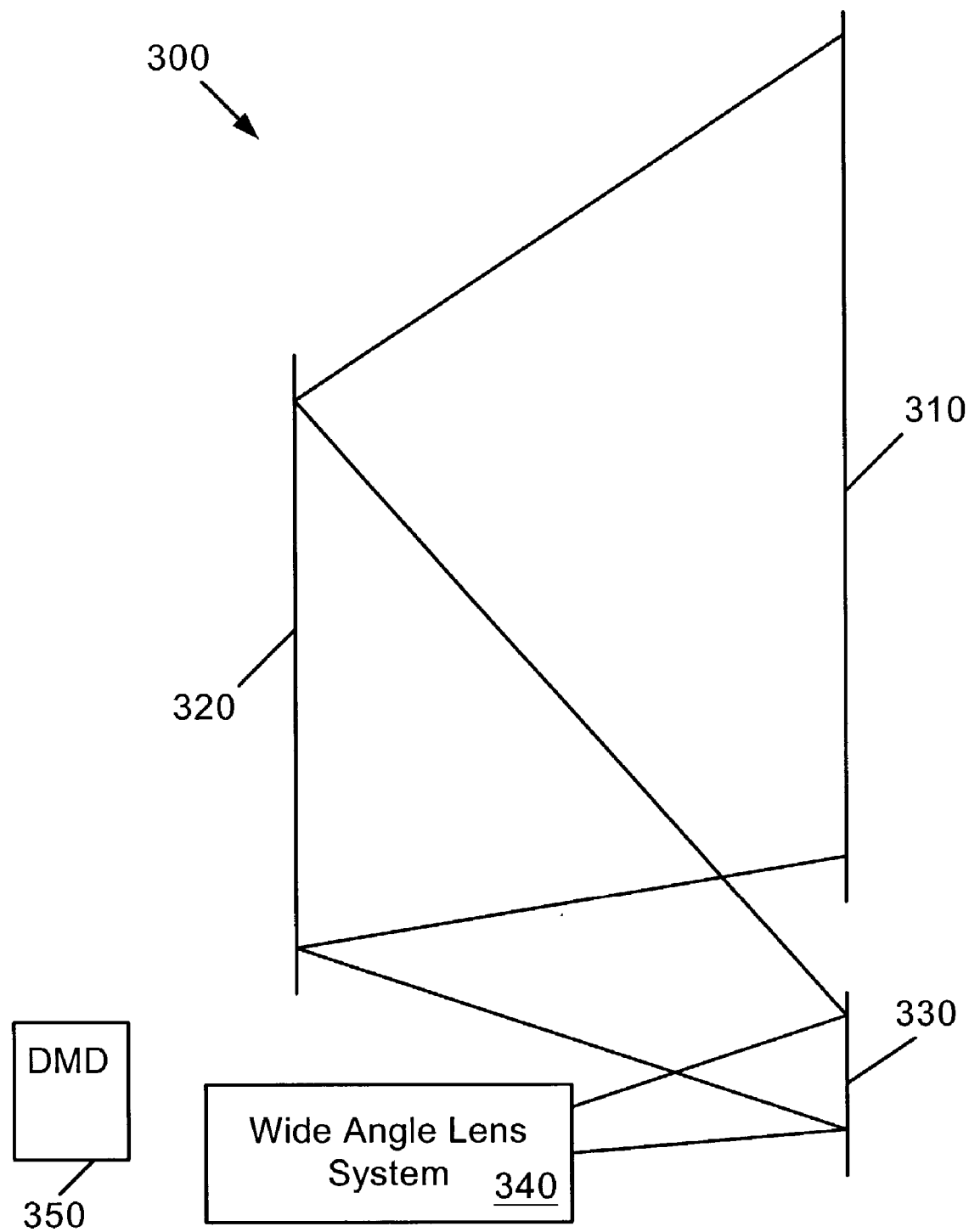
FIG. 3 illustrates one embodiment of an ultra-thin rear projection display device with planar mirrors parallel to a screen.

FIG. 3 illustrates one embodiment of a rear projection display device with planar mirrors parallel to a screen. As described in greater detail below, use of planar mirrors parallel to the screen as well as a wide angle projection lens having an optic axis that is perpendicular to the mirrors and the screen allows the rear projection display device to be thinner and simpler than prior art rear projection display devices. For example, an ultra-thin rear projection display device as described herein that is less than 7 inches thick can provide a 60 inch image.

In one embodiment, rear projection display device 300 includes screen 310, back plate mirror 320, intermediate mirror 330, lens system 340 and digital micromirror device (DMD) 350. Other components known in the art are not illustrated for reasons of simplicity of description. An image can be provided to DMD 350 in any manner known in the art. DMD 350 selectively reflects light from a light source (not shown in FIG. 3) to lens system 340. Any type of display device known in the art can be used in display device 300. Other types of devices (e.g., microelectromechanical systems (MEMS), grating light valve (GLV), liquid crystal display (LCD), liquid crystal on silicon (LCOS)) can be used to provide an image to lens system 340.

In one embodiment, DMD 350 is offset from the optic axis of lens system 340 such that only a portion (e.g., 50%, 60%, 40%) of the available lens field is used. By offsetting DMD 350 with respect to the optic axis of lens system 340, the image from DMD 350 is projected by lens system 340 in the upper portion of the lens field to intermediate mirror 330. Alternatively, a lower portion of the lens field can be used to project an image to intermediate mirror 330. In such an embodiment, lens system 340 would be above intermediate mirror 330, which would be above back plate mirror 320.

In order to project an image as described, lens system 340 is a very wide angle lens system. In one embodiment, lens system 340 has a field angle of 152° or more; however, other lenses can be used. In general, the wider the angle of lens system 340, the thinner display device 300 can be made. Description of a suitable wide angle lens system is described in greater detail below.

Intermediate mirror 330 reflects the image to back plate mirror 320, which reflects the image to screen 310, which can be, for example, a Fresnel lens. Back plate mirror 320 is also a planar mirror and is parallel to screen 310 and perpendicular to the optic axis of lens system 340. Because the optic axis of lens system 340 is perpendicular to intermediate mirror 330 and both intermediate mirror 330 and back plate mirror 320 are planar and parallel to screen 310, the distortion caused by angled lenses and aspherical mirrors is absent in display device 300. This simplifies the design of display device 300 and reduces the cost and complexity of manufacturing. Embodiments of a rear projection display device in which the wide angle lens system described herein can be used is described in greater detail in the above-referenced patent application, which is incorporated by reference.

Figure 4:
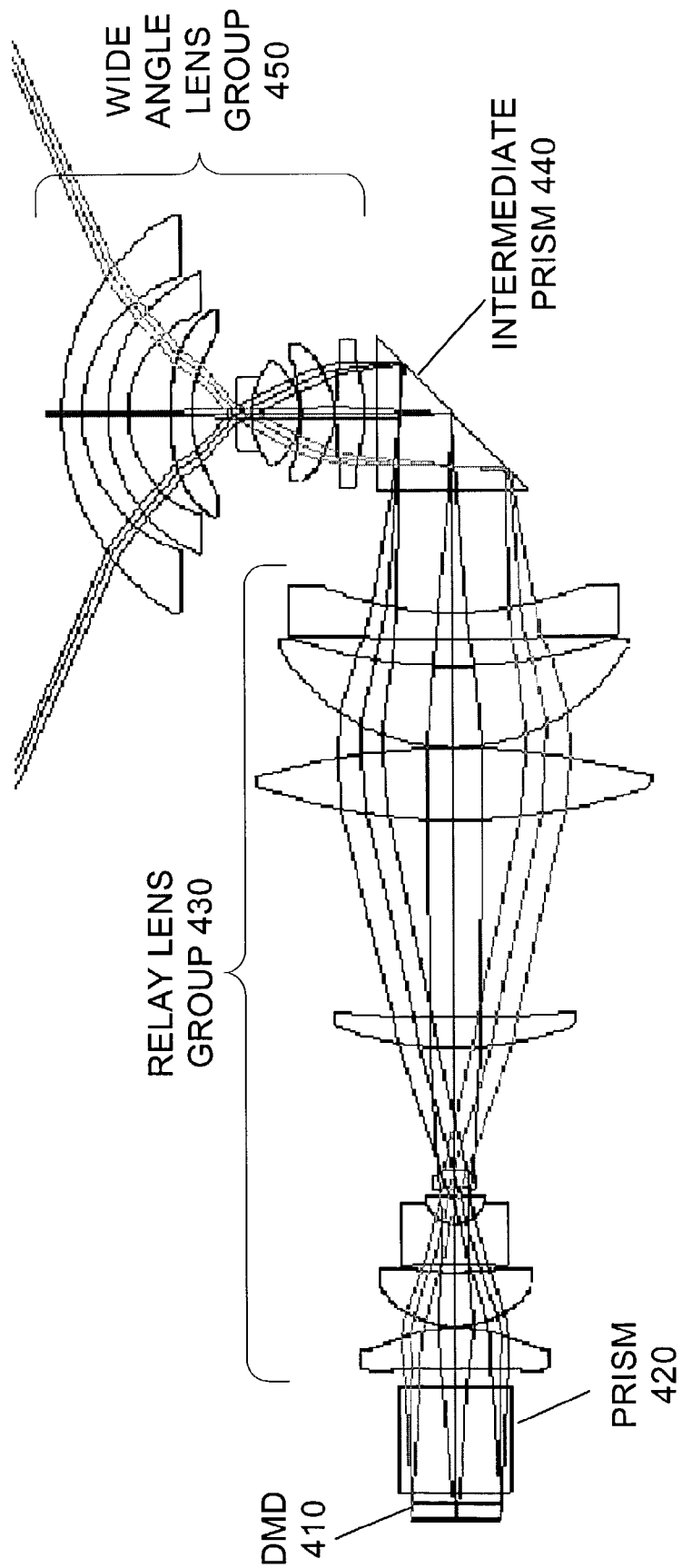
FIG. 4 illustrates one embodiment of a folded wide angle lens system having a distorted intermediate image.

FIG. 4 illustrates one embodiment of a folded wide angle lens system having a distorted intermediate image. While the lens system of FIG. 4 is described as a projection lens system, the lens system can also be used for image capture, for example, by a camera.

DMD 410 provides an image to the lens system. As described above, other types of devices can be used to provide an image to the lens system. Prism 420 directs the image to relay lens group 430. Relay lens group 430 projects the image from prism 420 to prism 440 and distorts the image such that intermediate prism 440 receives an intentionally distorted intermediate image.

In one embodiment, relay lens group 430 includes 9 lenses; however, any number of lenses can be used based on, for example, the desired distortion of the intermediate image, or the overall size of the lens system. The distortion to be caused by relay lens group 430 is equal and opposite the distortion caused by wide angle lens group 450. In one embodiment, the intermediate image is approximately a half circle image in a warped image plane. In alternate embodiments, other types of distortion can be used. For example, if the full lens field is to be used, the distorted intermediate image would be a generally circular image. Such distortion may be considered circular distortion. The image plane may or may not be warped.

Intermediate prism 440 provides a 90° fold of the image path. As described below with respect to FIG. 5, the fold is not required. Alternatively, other fold angles, for example, 45°, 30°, 135° could be used. Wide angle lens group 450 projects the distorted intermediate image to a screen for display. Because wide angle lens group 450 causes distortion to the image to be projected and the intermediate image has been pre-distorted by relay lens group 430, the resulting image projected by the lens system has little or no distortion. In one embodiment, the total distortion caused by relay lens group 430, wide angle lens group 450 and any associated prisms is less than 3%.

In one embodiment, the optic axes of the lenses of relay lens group 430 are aligned. Similarly, the optic axes of the lenses of wide angle lens group 450 are also aligned. Wide angle lens group provides a field angle of greater than 100°. In one embodiment the field angle is 153°; however, any angle can be provided. In one embodiment, the optical axis of wide angle lens group 450 is perpendicular to the screen so that keystone, or trapezoidal, distortion is absent.

Figure 5:
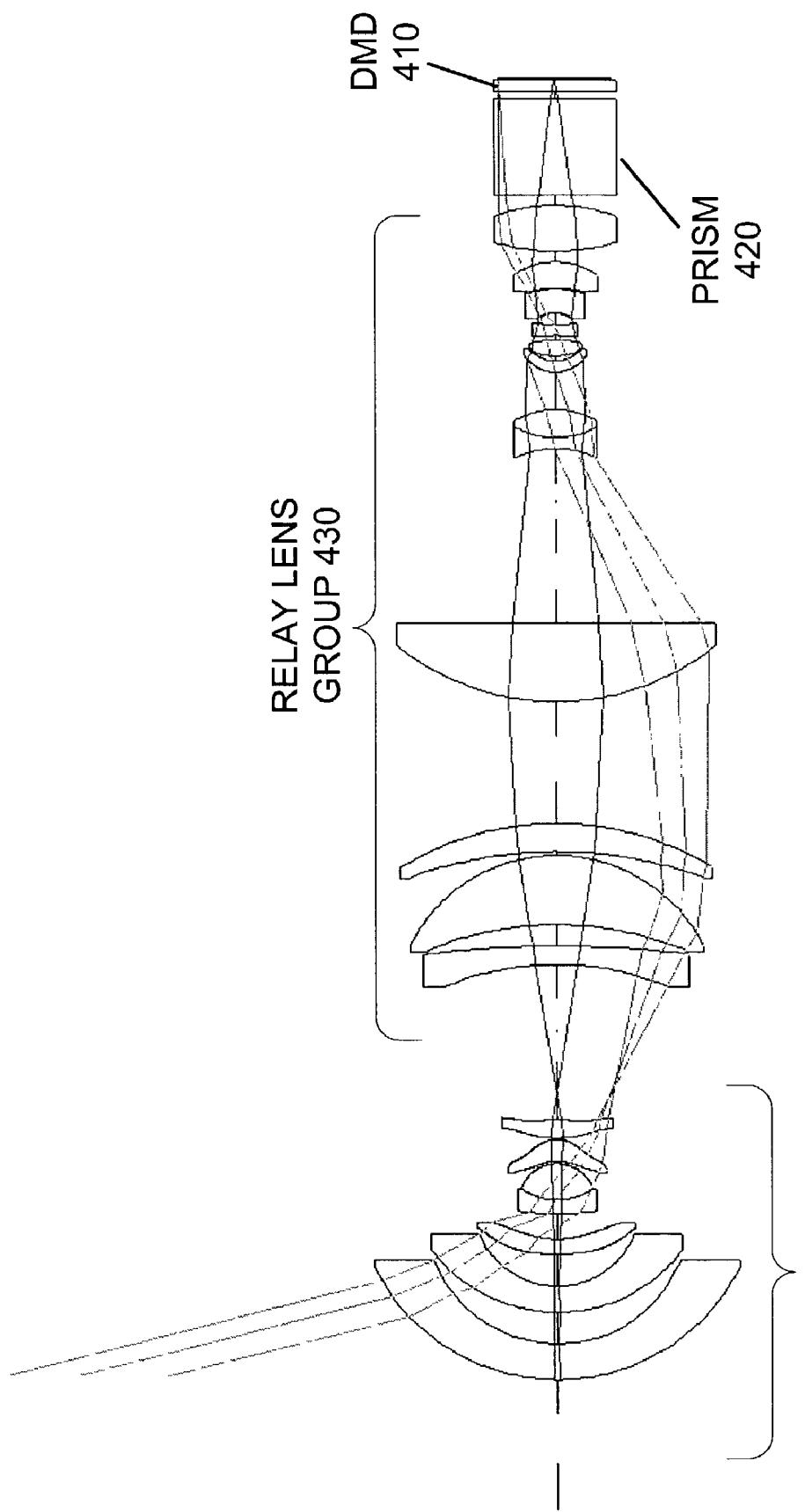
FIG. 5 illustrates one embodiment of a wide angle lens system having a distorted intermediate image.

FIG. 5 illustrates one embodiment of a wide angle lens system having a distorted intermediate image. The lens system of FIG. 5 is similar to the lens system of FIG. 4 except that the lens system of FIG. 5 is not folded. That is, wide angle lens system 450 is co-axial with relay lens system 430. The lens system of FIG. 5 does not include an intermediate prism. An intermediate prism can be included, if desired.

In one embodiment, the lens system of FIG. 5 has the following prescription:

| Surface | RDY | THI | RMD | GLA |
|---|---|---|---|---|
| 1: | 46.74531 | 4.000000 | | NBF1_HOYA |
| 2: | 28.81163 | 5.051213 | | |
| 3: | 30.58292 | 4.000000 | | NBFD10_HOYA |
| 4: | 21.01576 | 8.441106 | | |
| 5: | 129.13928 | 4.000000 | | SLAM60_OHARA |
| ASP: | | | | |

K: 0.000000
IC: YES            CUF: 0.000000
A: 0.664982E−04    B: −.187975E−06    C: 0.420794E−09
D: −.348519E−12
  6:      21.14941    8.859193

-continued

ASP:

K: 0.000000
IC: YES                CUF: 0.000000
A: −.367450E−04        B: 0.130594E−06        C: −.665374E−09
D: 0.794813E−12

| | | | |
|---|---:|---:|---|
| 7: | 78.00018 | 3.124861 | FDS90_HOYA |
| 8: | 16.67079 | 9.473114 | BACD16_HOYA |
| 9: | −13.03245 | 0.200000 | |
| 10: | −17.74399 | 6.650512 | MNBF1_HOYA |

ASP:

K: 0.000000
IC: YES                CUF: 0.000000
A: 0.314557E−03        B: −.254460E−05        C: 0.149709E−07
D: −.573297E−10

| | | |
|---|---:|---:|
| 11: | −14.40905 | 0.200000 |

ASP:

K: 0.000000
IC: YES                CUF: 0.000000
A: −.440469E−04        B: 0.237538E−05        C: −.134637E−07
D: 0.222969E−10

| | | | |
|---|---:|---:|---|
| 12: | 131.97096 | 6.000000 | MNBF1_HOYA |

ASP:

K: 0.000000
IC: YES                CUF: 0.000000
A: 0.711368E−04        B: −.624364E−06        C: 0.210000E−08
D: −.350000E−11

| | | |
|---|---:|---:|
| 13: | −15.59413 | 2.000000 |

ASP:

K: 0.000000
IC: YES                CUF: 0.000000
A: 0.257396E−03        B: −.884746E−06        C: 0.186450E−08
D: 0.216077E−11

| | | | |
|---|---:|---:|---|
| 14: | INFINITY | 30.000000 | FD60_HOYA |
| 15: | INFINITY | 24.565488 | |
| 16: | −64.35637 | 4.999034 | FD60_HOYA |
| 17: | −1966.99974 | 5.494742 | |
| 18: | −96.81620 | 16.104081 | NBFD13_HOYA |
| 19: | −39.51766 | 0.200000 | |
| 20: | 136.11245 | 14.269098 | LAC8_HOYA |
| 21: | −114.50422 | 39.301091 | |
| 22: | −250.53752 | 5.915028 | BACD16_HOYA |
| 23: | −62.97973 | 24.296450 | |
| STO: | 8.12022 | 3.000000 | FDS90_HOYA |
| 25: | 7.27512 | 2.000000 | |
| 26: | −67.85690 | 5.522870 | BACD16_HOYA |
| 27: | −5.88750 | 7.902370 | FDS90_HOYA |
| 28: | 135.96725 | 1.688647 | |
| 29: | −35.98083 | 10.637917 | MNBF1_HOYA |

ASP:

K: 0.000000
IC: YES                CUF: 0.000000
A: 0.956626E−04        B: 0.298084E−06        C: −.100781E−07
D: 0.371253E−10

| | | |
|---|---:|---:|
| 30: | −16.84259 | 0.200000 |

ASP:

K: 0.000000
IC: YES                CUF: 0.000000
A: 0.434637E−04        B: 0.131005E−06        C: −.120433E−08
D: 0.718134E−12

| | | | |
|---|---:|---:|---|
| 31: | 29.02346 | 8.028674 | SLAH60_OHARA |

ASP:

K: 0.000000
IC: YES                CUF: 0.000000
A: 0.696210E−05        B: −.847612E−07        C: 0.104328E−09
D: −.182720E−12

| | | |
|---|---:|---:|
| 32: | 186.81664 | 4.000000 |

ASP:

K: 0.000000
IC: YES                CUF: 0.000000
A: −.196461E−05        B: 0.343490E−07        C: −.146991E−09
D: 0.000000E+00

| | | | |
|---|---:|---:|---|
| 33: | INFINITY | 21.000000 | BSC7_HOYA |
| 34: | INFINITY | 2.000000 | |
| 35: | INFINITY | 3.000000 | FC5_HOYA |
| 36: | INFINITY | 0.440000 | |

In the above prescription, surfaces 1–13 correspond to wide angle lens group 450 and surfaces 16–32 correspond to relay lens group 430. In alternate embodiments, other prescriptions and/or other materials can also be used.

Figure 6:
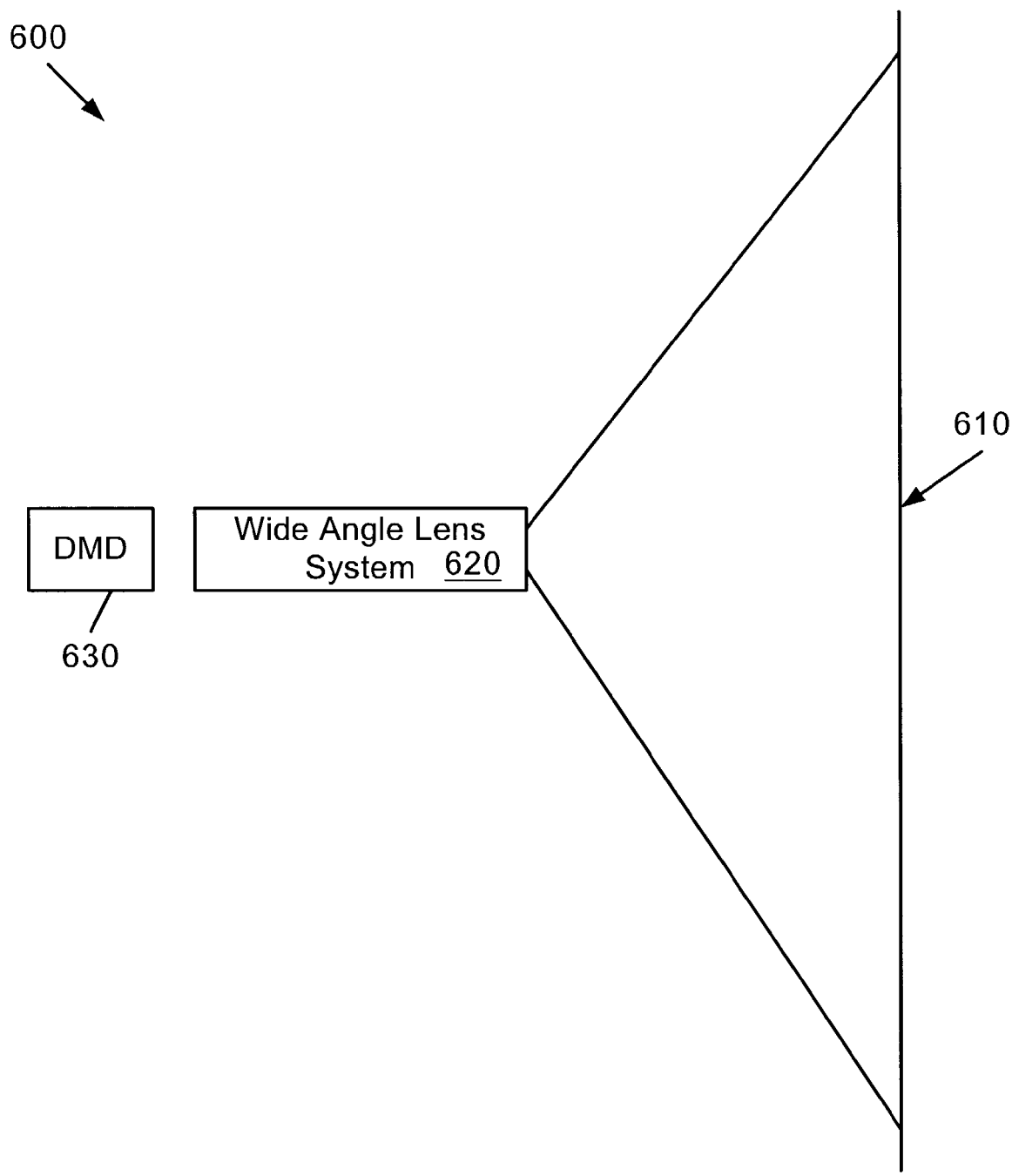
FIG. 6 illustrates one embodiment of a rear projection display device with a wide angle lens system having an intermediate image.

FIG. 6 illustrates one embodiment of a rear projection display device having a wide angle lens. Display device 600 includes screen 610, wide angle lens system 620 and DMD 630. In one embodiment, screen 610 is a Fresnel lens as described in greater detail in the related application referenced above, which is incorporated by reference herein.

An image is generated a provided by optical engine components (not shown in FIG. 6) that are known in the art and directed to wide angle lens system 620 via DMD 630. In alternate embodiments, DMD 630 can be replaced by other components, for example, microelectromechanical systems (MEMS), grating light valves (GLV), liquid crystal display (LCD), liquid crystal on silicon (LCOS), etc. The optic axis of DMD 630 is aligned with the optic axis of wide angle lens system 620 so that the full lens field is used to project the image to screen 610.

As described herein, an image is projected on a screen through a wide angle lens system. The screen can be a Fresnel lens. However, many other objects can operate as a screen for purposes of displaying an image. In general, any object that diffuses light can be used as a screen. For example, a wall, water or fog can be used as a screen.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A lens system comprising:
   a first stage to create a distorted intermediate image wherein the first stage comprises lenses according to:

| Surface | RDY | THI |
|---|---:|---:|
| 1: | −64.35637 | 4.999034 |
| 2: | −1966.99974 | 5.494742 |
| 3: | −96.81620 | 16.104081 |
| 4: | −39.51766 | 0.200000 |
| 5: | 136.11245 | 14.269098 |
| 6: | −114.50422 | 39.301091 |

-continued

| | | |
|---|---|---|
| 7: | −250.53752 | 5.915028 |
| 8: | −62.97973 | 24.296450 |
| STO: | 8.12022 | 3.000000 |
| 8: | 7.27512 | 2.000000 |
| 9: | −67.85690 | 5.522870 |
| 10: | −5.88750 | 7.902370 |
| 11: | 135.96725 | 1.688647 |
| 12: | −35.98083 | 10.637917 |
| ASP: | | |

K: 0.000000
IC: YES          CUF: 0.000000
A: 0.956626E−04  B: 0.298084E−06    C: −.100781E−07
D: 0.371253E−10

| 13: | −16.84259 | 0.200000 |
|---|---|---|
| ASP: | | |

K: 0.000000
IC: YES          CUF: 0.000000
A: 0.434637E−04  B: 0.131005E−06    C: −.120433E−08
D: 0.718134E−12

| 14: | 29.02346 | 8.028674 |
|---|---|---|
| ASP: | | |

K: 0.000000
IC: YES          CUF: 0.000000
A: 0.696210E−05  B: −.847612E−07    C: 0.104328E−09
D: −.182720E−12

| 15: | 186.81664 | 4.000000 |
|---|---|---|
| ASP: | | |

K: 0.000000
IC: YES          CUF: 0.000000
A: −.196461E−05  B: 0.343490E−07    C: −.146991E−09
D: 0.000000E+00;
and a second, wide angle lens stage that causes distortion to substantially cancel the distortion of the intermediate image and to project a substantially non-distorted image corresponding to the intermediate image.

2. A lens system comprising:
   a first stage to create a distorted intermediate image; and
   a second, wide angle lens stage that causes distortion to substantially cancel the distortion of the intermediate image and to project a substantially non-distorted image corresponding to the intermediate image wherein the second stage comprises lenses according to:

| Surface | RDY | THI |
|---|---|---|
| 1: | 46.74531 | 4.000000 |
| 2: | 28.81163 | 5.051213 |
| 3: | 30.58292 | 4.000000 |
| 4: | 21.01576 | 8.441106 |
| 5: | 129.13928 | 4.000000 |
| ASP: | | |

K: 0.000000
IC: YES          CUF: 0.000000
A: 0.664982E−04  B: −.187975E−06    C: 0.420794E−09
D: −.348519E−12

| 6: | 21.14941 | 8.859193 |
|---|---|---|
| ASP: | | |

K: 0.000000
IC: YES          CUF: 0.000000
A: −.367450E−04  B: 0.130594E−06    C: −.665374E−09

-continued

D: 0.794813E−12

| 7: | 78.00018 | 3.124861 |
|---|---|---|
| 8: | 16.67079 | 9.473114 |
| 9: | −13.03245 | 0.200000 |
| 10: | −17.74399 | 6.650512 |
| ASP: | | |

K: 0.000000
IC: YES          CUF: 0.000000
A: 0.314557E−03  B: −.254460E−05    C: 0.149709E−07
D: −.573297E−10

| 11: | −14.40905 | 0.200000 |
|---|---|---|
| ASP: | | |

K: 0.000000
IC: YES          CUF: 0.000000
A: −.440469E−04  B: 0.237538E−05    C: −.134637E−07
D: 0.222969E−10

| 12: | 131.97096 | 6.000000 |
|---|---|---|
| ASP: | | |

K: 0.000000
IC: YES          CUF: 0.000000
A: 0.711368E−04  B: −.624364E−06    C: 0.210000E−08
D: −.350000E−11

| 13: | −15.59413 | 2.000000 |
|---|---|---|
| ASP: | | |

K: 0.000000
IC: YES          CUF: 0.000000
A: 0.257396E−03  B: −.884746E−06    C: 0.186450E−08
D: 0.216077E−11.

3. A display device comprising:
   a screen; and
   a wide angle lens system having a first stage to create a distorted intermediate image wherein the distorted intermediate image is distorted to accommodate for wide angle distortion created by a wide angle lens; wherein the distorted intermediate image is a generally circular image and a second, wide angle lens stage providing a field of at least 100° that causes distortion to substantially cancel distortion of the intermediate image and to project a substantially non-distorted image corresponding to the intermediate image on the screen.

4. The display device of claim 3 further comprising a substantially planar back plate mirror to reflect the image to the screen, wherein the back plate mirror is substantially perpendicular to the optic axis of the wide angle lens system and substantially parallel to the screen.

5. The display device of claim 4 further comprising a substantially planar intermediate mirror to reflect the image projected by the wide angle lens system to the back plate mirror, the intermediate mirror being parallel to the back plate mirror.

6. The display device of claim 5 wherein the screen comprises a total internal reflection (TIR) Fresnel lens.

7. The display device of claim 3 wherein the screen comprises a refractive Fresnel lens.

8. The display device of claim 5 wherein the wide angle lens system projects the image using approximately one-half of the lens field.

9. The display device of claim 3 wherein the wide angle lens system projects the image using less than one-half of the lens field.

10. The display device of claim 3 further comprising a microelectromechanical system (MEMS) to provide the image to the wide angle lens system.

11. The display device of claim 10 further comprising a digital micromirror device (DMD) to provide the image to the wide angle lens system.

12. The display device of claim 3 further comprising a grating light valve (GLV) to provide the image to the wide angle lens system.

13. The display device of claim 3 further comprising a liquid crystal display (LCD) to provide the image to the wide angle lens system.

14. The display device of claim 13 further comprising a liquid crystal on silicon (LCOS) display to provide the image to the wide angle lens system.

15. A method comprising:
projecting an image with a relay lens group to generate a distorted intermediate image; and
projecting the distorted intermediate image with a wide angle lens group to generate a substantially non-distorted final image, wherein the distortion caused by the first lens group is substantially equal and opposite the distortion caused by the second lens group and wherein the wide angle lens group comprises lenses according to:

| Surface | RDY | THI |
|---|---|---|
| 1: | −64.35637 | 4.999034 |
| 2: | −1966.99974 | 5.494742 |
| 3: | −96.81620 | 16.104081 |
| 4: | −39.51766 | 0.200000 |
| 5: | 136.11245 | 14.269098 |
| 6: | −114.50422 | 39.301091 |
| 7: | −250.53752 | 5.915028 |
| 8: | −62.97973 | 24.296450 |
| STO: | 8.12022 | 3.000000 |
| 8: | 7.27512 | 2.000000 |
| 9: | −67.85690 | 5.522870 |
| 10: | −5.88750 | 7.902370 |
| 11: | 135.96725 | 1.688647 |
| 12: | −35.98083 | 10.637917 |

ASP:

K: 0.000000
IC: YES    CUF: 0.000000
A: 0.956626E−04    B: 0.298084E−06    C: −.100781E−07
D: 0.371253E−10

| | 13: | −16.84259 | 0.200000 |

ASP:

K: 0.000000
IC: YES    CUF: 0.000000
A: 0.434637E−04    B: 0.131005E−06    C: −.120433E−08
D: 0.718134E−12

| | 14: | 29.02346 | 8.028674 |

ASP:

K: 0.000000
IC: YES    CUF: 0.000000
A: 0.696210E−05    B: −.847612E−07    C: 0.104328E−09
D: −.182720E−12

| | 15: | 186.81664 | 4.000000 |

ASP:

K: 0.000000
IC: YES    CUF: 0.000000
A: −.196461E−05    B: 0.343490E−07    C: −.146991E−09
D: 0.000000E+00.

16. A method comprising:
projecting an image with a relay lens group to generate a distorted intermediate image wherein the relay lens group comprises lenses according to:

| Surface | RDY | THI |
|---|---|---|
| 1: | 46.74531 | 4.000000 |
| 2: | 28.81163 | 5.051213 |
| 3: | 30.58292 | 4.000000 |
| 4: | 21.01576 | 8.441106 |
| 5: | 129.13928 | 4.000000 |

ASP:

K: 0.000000
IC: YES    CUF: 0.000000
A: 0.664982E−04    B: −.187975E−06    C: 0.420794E−09
D: −.348519E−12

| | 6: | 21.14941 | 8.859193 |

ASP:

K: 0.000000
IC: YES    CUF: 0.000000
A: −.367450E−04    B: 0.130594E−06    C: −.665374E−09
D: 0.794813E−12

| | 7: | 78.00018 | 3.124861 |
| | 8: | 16.67079 | 9.473114 |
| | 9: | −13.03245 | 0.200000 |
| | 10: | −17.74399 | 6.650512 |

ASP:

K: 0.000000
IC: YES    CUF: 0.000000
A: 0.314557E−03    B: −.254460E−05    C: 0.149709E−07
D: −.573297E−10

| | 11: | −14.40905 | 0.200000 |

ASP:

K: 0.000000
IC: YES    CUF: 0.000000
A: −.440469E−04    B: 0.237538E−05    C: −.134637E−07
D: 0.222969E−10

| | 12: | 131.97096 | 6.000000 |

ASP:

K: 0.000000
IC: YES    CUF: 0.000000
A: 0.711368E−04    B: −.624364E−06    C: 0.210000E−08
D: −.350000E−11

| | 13: | −15.59413 | 2.000000 |

ASP:

K: 0.000000
IC: YES    CUF: 0.000000
A: 0.257396E−03    B: −.884746E−06    C: 0.186450E−08
D: 0.216077E−11;
and projecting the distorted intermediate image with a wide angle lens group to generate a substantially non-distorted final image, wherein the distortion caused by the first lens group is substantially equal and opposite the distortion caused by the second lens group.

17. A lens system comprising:
a relay lens group to create a distorted intermediate image, wherein the distorted intermediate image is a generally circular image; and
a wide angle lens group providing a field of at least 100° that causes wide angle distortion to substantially cancel the distortion of the intermediate image and to project an image having less than 3% distortion corresponding to the intermediate image.

18. The lens system of claim 17 wherein all lenses of the relay lens group are co-axial.

19. The lens system of claim 18 wherein all lenses of the wide angle lens group are co-axial.

20. The lens system of claim 19 wherein the wide angle lens group and the relay lens group are co-axial.

21. The lens system of claim 19 wherein the optic axis of the wide angle lens group and the optic axis of the relay lens group form an angle.

22. The lens system of claim 21 wherein the angle is approximately 90°.

23. The lens system of claim 21 wherein the angle is substantially less than 90°.

24. The lens system of claim 21 wherein the angle is substantially greater than 90°.

25. The display device of claim 3, wherein the wide angle lens stage is greater than 100° full field.

26. A lens system comprising:
a first stage to create an intermediate image with circular distortion and
a second, wide angle lens stage with a wide angle lens greater than 100° full field which substantially cancels the circular distortion of the intermediate image and which projects a substantially non-distorted image corresponding to the intermediate image.

27. The lens system of claim 26 wherein the optic axis of the first stage and the optic axis of the second stage form an angle.

28. The lens system of claim 27 wherein the angle is approximately 90°.

29. The lens system of claim 27 wherein the angle is substantially less than 90°.

30. The lens system of claim 27 wherein the angle is substantially greater than 90°.

31. The lens system of claim 26 wherein the lenses of the first stage are co-axial and the lenses of the second stage are co-axial.

32. The lens system of claim 26 wherein the distortion is less than 3%.

33. The lens system of claim 26 wherein the relative illumination of the extreme angles is greater than 30%.

34. A lens system for displaying an image on a screen, the lens system comprising:
a first stage to create a distorted intermediate image; and
a second, wide angle lens stage having a wide angle lens with a field anal of treater than 100° that causes wide angle distortion to substantially cancel the distortion of the intermediate image and to project a substantially non-distorted image corresponding to the intermediate image
wherein the first stage and the second stare are coaxial and lenses of the first stage are coaxial with lenses of the second stage and wherein an optic axis of the wide angle lens stage is perpendicular to the screen.

35. The lens system of claim 34 wherein the optic axis of the first stage and the optic axis of the second stage form an angle.

36. The lens system of claim 35 wherein the angle is approximately 90°.

37. The lens system of claim 35 wherein the angle is substantially less than 90°.

38. The lens system of claim 35 wherein the angle is substantially greater than 90°.

39. The lens system of claim 34 wherein the distortion is less than 3%.

40. The lens system of claim 34 wherein the relative illumination of the extreme angles is greater than 30%.

41. The wide angle lens stage of claim 34, wherein the wide angle is greater than 100° full field.

42. The lens system of claim 26, wherein the intermediate image is in a warped image plane.

43. The lens system of claim 3, wherein the intermediate image is approximately a half circle image.

44. The lens system of claim 17, wherein the intermediate image is approximately a half circle image.

45. The lens system of claim 26, wherein the intermediate image is approximately a half circle image.

46. A lens system comprising:
a first stage having a plurality of lenses configured to generate a distorted intermediate image with intermediate image distortion; and
a second, wide angle lens stage having a wide angle lens with a field angle greater then 100° where the wide angle lens is coaxial with the plurality of lenses of the first stage, the wide angle lens creating substantial wide angle distortion where the images of objects near the edge of the field are compressed in the radial direction, wherein the intermediate image distortion is substantially equal and opposite the substantial wide angle distortion of the wide angle lens stage such that the wide angle distortion substantially cancels the intermediate image distortion to project a substantially non-distorted image.

47. The lens system of claim 46, wherein the distorted intermediate image is a generally circular image.

48. The lens system of claim 47, wherein the distorted intermediate image is approximately a half circle image.

49. The lens system of claim 46, wherein the distorted intermediate image is in a warped image plane.

50. The lens system of claim 46 wherein an optic axis of the first stage and an optic axis of the second stage form an angle.

51. The lens system of claim 50 wherein the angle is approximately 90°.

52. The lens system of claim 50 wherein the angle is substantially less than 90°.

53. The lens system of claim 50 wherein the angle is substantially greater than 90°.

54. A lens system comprising:
a first stage to create a distorted intermediate image, the distorted intermediate image includes substantially no trapezoidal distortion; and
a second, wide angle lens stage having a wide angle lens with a field angle of greater than 100° that causes wide angle distortion to substantially cancel the distortion of the intermediate image and to project a substantially non-distorted image corresponding to the intermediate image.

55. The lens system of claim 54, wherein the distorted intermediate image is a generally circular image.

56. The lens system of claim 55, wherein the intermediate image is approximately a half circle image.

57. The lens system of claim 54, wherein the intermediate image is in a warped image plane.

58. The lens system of claim 54, wherein the lenses of the first stage are co-axial and the lenses of the second stage are co-axial.

59. A lens system comprising:
a first lens stage including a plurality of lens elements with a total positive power, the first lens stage configured to create a distorted intermediate image, wherein the distorted intermediate image is a generally circular image; and
a second, wide angle lens stage with a wide angle lens greater than 100° full field, the second wide angle lens stage configured to generate wide angle distortion which substantially cancels the distortion of the intermediate image to project a substantially non-distorted image.

60. The lens system of claim 46, wherein the second wide angle lens stage includes a first group of lens elements with a total positive power and a second group of lens elements with a total negative power.

* * * * *

UNITED STATES PATENT AND TRADEMARK OFFICE
CERTIFICATE OF CORRECTION

PATENT NO. : 7,009,765 B2
APPLICATION NO. : 10/222050
DATED : March 7, 2006
INVENTOR(S) : Jeffrey Alan Gohman It is certified that error appears in the above-identified patent and that said Letters Patent is hereby corrected as shown below:

In Column 8, line 54, delete "display device of claim 5" and insert --display device of claim 3-- therefor.

In Column 8, line 59, delete "display device of claim 5" and insert --display device of claim 3-- therefor.

In Column 11, line 38, delete "field anal of a treater" and insert --field angle of a greater-- therefor.

Signed and Sealed this

Nineteenth Day of September, 2006

JON W. DUDAS
*Director of the United States Patent and Trademark Office*